(12) United States Patent
De Mersseman et al.

(10) Patent No.: US 6,993,422 B2
(45) Date of Patent: Jan. 31, 2006

(54) PRE-CRASH NOSE DIPPING SYSTEM

(75) Inventors: Bernard De Mersseman, Royal Oak, MI (US); Saeed D. Barbat, Farmington Hills, MI (US); Charles J. Sherwin, Mayville, MI (US); Stephen W. Decker, Clarkston, MI (US)

(73) Assignee: Autoliv ASP, Inc., Ogden, UT (US)

( * ) Notice: Subject to any disclaimer, the term of this patent is extended or adjusted under 35 U.S.C. 154(b) by 153 days.

(21) Appl. No.: 10/671,400

(22) Filed: Sep. 25, 2003

(65) Prior Publication Data

US 2005/0068224 A1 Mar. 31, 2005

(51) Int. Cl.
*B60G 17/00* (2006.01)

(52) U.S. Cl. .......................... 701/37; 701/301; 342/72; 280/5.504

(58) Field of Classification Search ............ 701/37–39, 701/301; 342/72; 280/5.5, 5.504; 293/102, 293/103, 107, 110, 132, 134, 142
See application file for complete search history.

(56) References Cited

U.S. PATENT DOCUMENTS

| | | | |
|---|---|---|---|
| 4,103,951 A | | 8/1978 | Bank et al. |
| 5,008,678 A | | 4/1991 | Herman |
| 6,107,955 A | | 8/2000 | Wagner |
| 6,181,273 B1 | | 1/2001 | Heide et al. |
| 6,404,381 B1 | | 6/2002 | Heide et al. |
| 6,420,996 B1 | * | 7/2002 | Stopczynski et al. ......... 342/70 |
| 6,452,535 B1 | * | 9/2002 | Rao et al. ...................... 342/72 |
| 6,480,144 B1 | * | 11/2002 | Miller et al. .................. 342/72 |
| 6,498,972 B1 | * | 12/2002 | Rao et al. ...................... 701/45 |
| 6,728,617 B2 | * | 4/2004 | Rao et al. ...................... 701/45 |
| 2005/0080530 A1 | * | 4/2005 | Arduc et al. .................. 701/37 |

FOREIGN PATENT DOCUMENTS

WO WO 01/26922 A1 4/2001

* cited by examiner

*Primary Examiner*—Gary Chin
(74) *Attorney, Agent, or Firm*—Sally J. Brown

(57) ABSTRACT

A system for adjusting a height of a first road vehicle with respect to the ground prior to impacting a second road vehicle is disclosed. The system includes a predictive crash sensor mounted to the first vehicle for sensing the second road vehicle, a control unit, and a height adjustment apparatus. The control unit is in communication with the predicative crash sensor for receiving a predictive crash signal and determining whether the first and the second road vehicles will collide. The height adjustment apparatus is mounted to the first road vehicle and in communication with the control unit. The height adjustment apparatus includes a shock absorber, a bladder, and a first valve. The shock absorber is mounted at a first end to a vehicle body of the first road vehicle and at a second end to a vehicle axle of the first road vehicle. The bladder is fixed at a first end to the first end of the shock absorber and at a second end to the second end of the shock absorber. The first valve is in fluid communication with the bladder for releasing fluid stored in the bladder upon the issuance of a crash signal sent by the crash unit.

17 Claims, 5 Drawing Sheets

PRE-CRASH NOSE DIPPING SYSTEM

TECHNICAL FIELD

The present invention relates to safety systems for automotive vehicles and to systems for addressing vehicles of varying size involved in vehicle accidents.

BACKGROUND

Conventional vehicles today have front and rear bumpers which are designed to limit intrusion that can occur during a vehicle crash. Generally when two vehicles collide, the bumper of the first vehicle and the bumper of the second vehicle are located at the same height above the road such that the bumpers engage during the collision. The bumpers are positioned to receive energy developed during a vehicle impact and to transfer the energy to the vehicle structure where the energy may be absorbed.

However, many vehicles today have increased ground clearance which corresponds to higher bumper heights relative to the ground. For example, vehicles such as light trucks, pick-up trucks, vans and sport utility vehicles have front and rear bumper heights that are substantially higher relative to the ground than typical passenger vehicles. When a vehicle having a substantially higher bumper height impacts a typical passenger vehicle with a substantially lower vehicle height relative to the ground, the bumpers are not aligned and, thus, during impact do not engage.

Significant intrusion generally occurs when the bumper of one vehicle involved in a crash does not engage the bumper of the other vehicle. Intrusion of the vehicle structure will likely result in serious injury to a vehicle occupant.

Thus, there is a need for a new and improved system and method for protecting vehicle occupants when the vehicles involved in the crash have substantially different bumper heights relative to the ground.

SUMMARY

In an aspect of the present invention a system for adjusting a height of a first road vehicle with respect to the ground prior to impacting a second road vehicle is provided. The system includes a predictive crash sensor mounted to the first vehicle for sensing the second road vehicle, a control unit, and a height adjustment apparatus. The control unit is in communication with the predicative crash sensor for receiving a predictive crash signal and determining whether the first and the second road vehicles will collide. The height adjustment apparatus is mounted to the first road vehicle and in communication with the control unit. The height adjustment apparatus includes a shock absorber, a bladder, and a first valve. The shock absorber is mounted at a first end to a vehicle body of the first road vehicle and at a second end to a vehicle axle of the first road vehicle. The bladder is fixed at a first end to the first end of the shock absorber and at a second end to the second end of the shock absorber. The first valve is in fluid communication with the bladder for releasing fluid stored in the bladder upon the issuance of a crash signal sent by the crash unit.

In another aspect of the present invention a second valve is provided in communication with the first valve for actuating the first valve.

In still another aspect of the present invention the second valve is a solenoid valve.

In still another aspect of the present invention a pilot tube connecting the first valve with the second valve for actuating the first valve.

In yet another aspect of the present invention the first valve includes a diaphragm for releasing fluid from the bladder.

In yet another aspect of the present invention the second valve is mounted to the bladder.

In still another aspect of the present invention the first valve is mounted to a wall of the bladder.

In still another aspect of the present invention the second valve is connected to the control unit.

In still another aspect of the present invention the predictive crash sensor is a radar sensor.

In still another aspect of the present invention the shock absorber is a variable damper shock absorber wherein the damping characteristics of the shock absorber may be varied.

In still another aspect of the present invention the second valve is electrically connected to the control unit.

In still another aspect of the present invention the second valve is in fluid communication with the first valve.

In still another aspect of the present invention a silencer is provided in communication with the first valve for reducing noise created by releasing fluid from the bladder.

In yet another aspect of the present invention a method for adjusting a height of a first road vehicle with respect to the ground prior to impacting a second road vehicle is provided. The method includes sensing the second road vehicle using a predictive crash sensor mounted to the first vehicle, receiving a predictive crash signal from a control unit in communication with the predicative crash sensor, determining whether the first and the second road vehicles will collide; and adjusting a height of the first vehicle with respect to the ground using a height adjustment apparatus. The height adjustment apparatus is mounted to the first road vehicle and in communication with the control unit. The height adjustment apparatus includes a shock absorber, a bladder, and a first valve. The shock absorber is mounted at a first end to a vehicle body of the first road vehicle and at a second end to a vehicle axle of the first road vehicle. The bladder is fixed at a first end to the first end of the shock absorber and at a second end to the second end of the shock absorber. The first valve is in fluid communication with the bladder for releasing fluid stored in the bladder upon the issuance of a crash signal sent by the crash unit.

These and other aspects and advantages of the present invention will become apparent upon reading the following detailed description in combination with the accompanying drawings.

DETAILED DESCRIPTION

Figure 1:
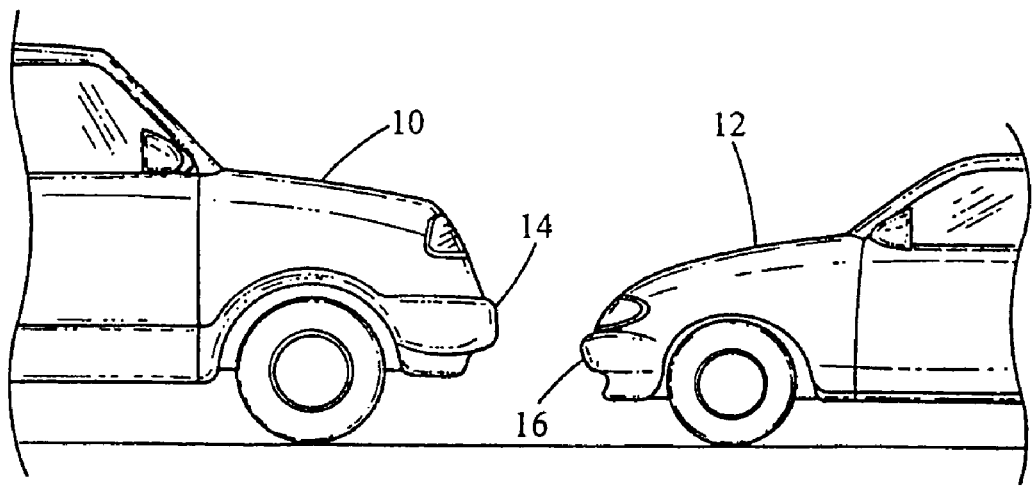
FIG. 1 is a schematic illustration of a first vehicle prior to impacting a front end of a conventional vehicle, in accordance with an embodiment of the present invention.

Referring now to FIG. 1, a schematic illustration of a first vehicle 10 impacting a conventional vehicle 12 is shown. First vehicle 10 and conventional vehicle 12 have front bumpers 14 and 16 that are designed to absorb energy during a vehicle collision. First vehicle 10 is a vehicle that has higher ground clearance relative to typical passenger vehicles. For example, first vehicle 10 is a sports utility vehicle (SUV) or a light truck. Accordingly, a height of bumper 14 with respect to the ground is higher than a height of bumper 16 with respect to the ground. Thus, front bumper 14 of first vehicle 10 is not aligned with and will not engage front bumper 16 of conventional vehicle 12 during a vehicle collision. In fact, it is likely that during a frontal impact, front bumper 14 will ride-over front bumper 16 of conventional vehicle 12 causing substantial damage to conventional vehicle 12. The vehicle structure (vehicle frame) designed to absorb energy during vehicle collision will not be engaged.

Figure 2:
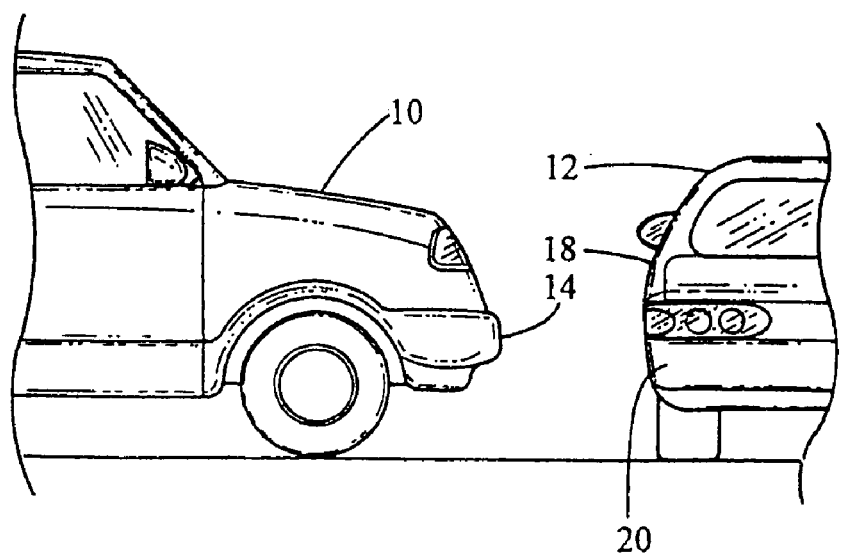
FIG. 2 is a schematic illustration of a first vehicle prior to impacting a side of a conventional vehicle, in accordance with an embodiment of the present invention.

Similarly, if first vehicle 10 is involved in a side impact collision with conventional vehicle 12, as shown in FIG. 2, severe damage will occur to conventional vehicle 12 since bumper 14 of first vehicle 10 will impact conventional vehicle 12 in an area well above the structural support members (vehicle frame) of vehicle 12. In such a situation, bumper 14 of first vehicle 10 will engage the door or side panel 18 of conventional vehicle 12 and drive the door or side panel inwardly into the interior of conventional vehicle 12. Thus, occupants seated within vehicle 12 may be seriously injured by the intruding panel/door 18.

Figure 3:
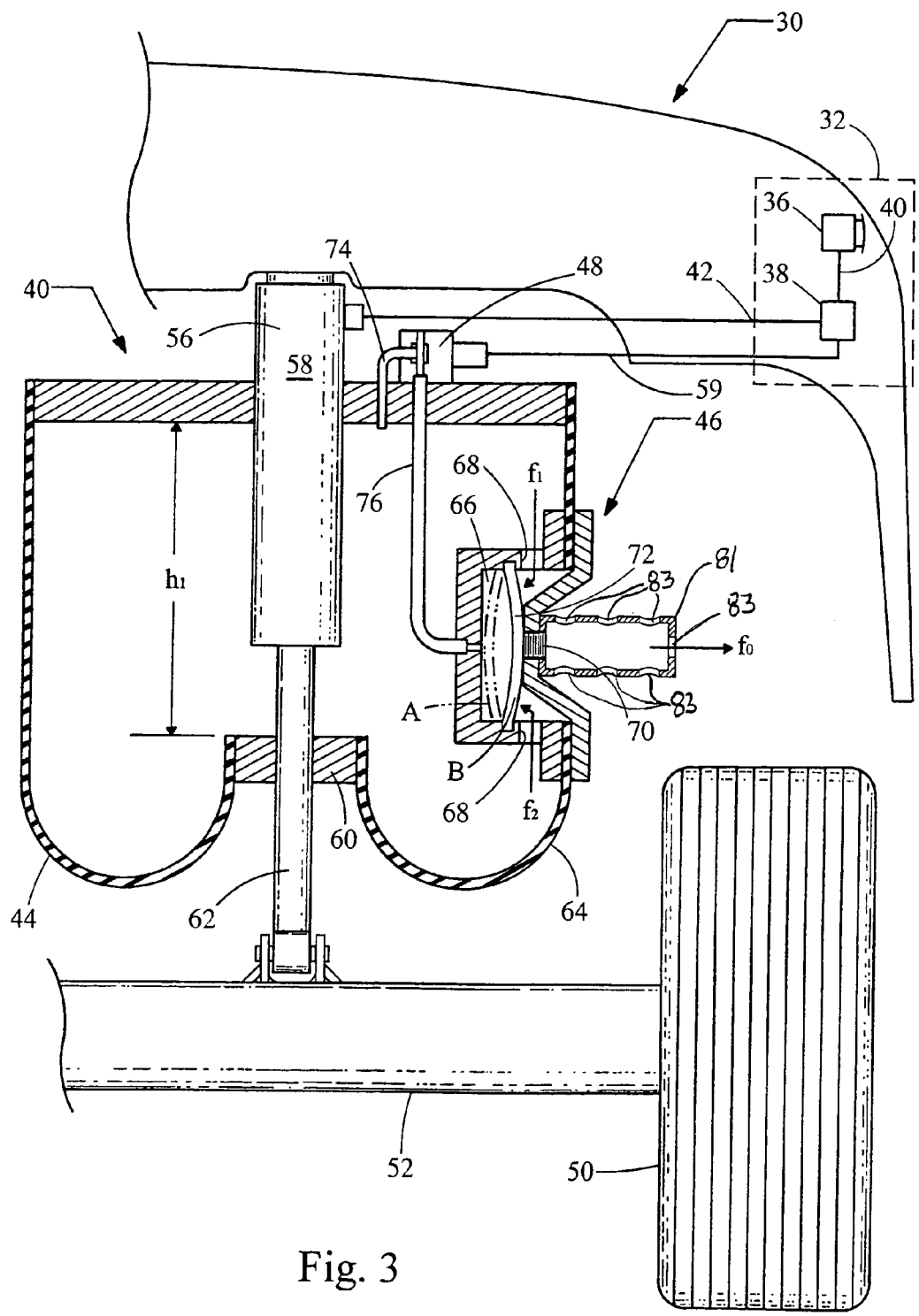
FIG. 3 is a diagrammatic illustration of a system for lowering a first vehicle with respect to the ground to improve the safety of occupants during a vehicle collision, in accordance with an embodiment the present invention.

Referring now to FIG. 3, a system 30 for lowering (or dipping the front end of) first vehicle 10 with respect to the ground to improve the safety of occupants during a vehicle collision is illustrated, in accordance with the present invention. System 30 includes a sensor system 32, adapted to sense a potential accident or a vehicle collision, and a vehicle height adjustment apparatus 34 that adjusts the effective height of first vehicle 10 with respect to conventional vehicle 12. More specifically, vehicle height adjustment apparatus 34 lowers (or dips) the front end of vehicle 10 with respect to the ground to align the bumpers 14, 16 of vehicles 10 and 12. The front end of vehicle 10 should be lowered by between 100 mm and 250 mm and in less than 350 milliseconds from determining that a vehicle collision is imminent.

With continuing reference to FIG. 3, sensor system 32 is provided for sensing an impending vehicle impact. Sensor system 32 includes a predictive sensor 36 and a predictive sensor control unit 38. Predictive sensor 36 may be a radar sensor adapted to sense another vehicle within a predetermined range. The radar, for example, may be a microwave radar. The radar may sense any other vehicle within a sensing area that extends ten meters forward of vehicle 10. However, other types of predictive sensors may be used in place of predictive sensor 36 such as an optical sensor or an ultrasonic sensor.

Predictive sensor 36 is in communication with predictive control unit 38 and provides an output signal along line 40 thereto. Control unit 38 is adapted to receive and process the output signal from predictive sensor 36 and to determine when a vehicle impact is imminent. Accordingly, predictive control unit 36 includes a microprocessor or similar device(s) and memory for storing and executing control logic for making a determination as to whether vehicles 10 and 12 will collide. Of course, the control logic could be implemented in software or hardware or in both software and hardware. Generally, unit 36 generates a control signal on line 42 when a determination is made that a vehicle impact will occur. In an embodiment of the present invention, control unit 36 includes control code to close diaphragm valve 46 between sixty and one hundred milliseconds after opening valve 46, in order to:

a) control dipping or lowering height of vehicle 10 based on crash type or configuration (i.e. head-on collision, side-impact, rear-impact, etc.);

b) prevent external humid air to enter the pneumatic circuit (described below); and c) reduce vehicle bouncing against the jounce stop and resulting compression of the tires.

Maximum dipping or lowering is desirable in a side-impact collision, whereas a lesser degree of dipping or lowering is needed for a head-on collision. Control unit 36 receives as primary inputs vehicle speed, vehicle suspension height, obstacle (or vehicle) range, and closing velocity. However, other inputs such as bladder pressure, longitudinal deceleration, brake system status and pressure may be used as well. In an embodiment of the present invention, control unit 38 and sensing unit 36 may be physically the same unit, sharing processors and resources.

Vehicle height adjustment apparatus 40 includes a bladder, a pilot operated diaphragm valve (or quick exhaust valve) 46, and solenoid operated valve (or pilot valve) 48. Bladder 44 is a flexible air or fluid bladder that is positioned between a vehicle body 50 and a vehicle axle 52. More specifically, in an embodiment of the present invention an upper end 54 of bladder 44 is fixed to an upper member 56 of a vehicle shock absorber 58 and a lower end 60 of bladder 44 is fixed to a lower member 62 of shock absorber 58. As known in the art, lower member 62 of shock absorber 58 is in turn connected to vehicle axle 52 and upper member 56 of shock 58 is connected to vehicle body 30. As air or fluid is injected into bladder 44 the distance between the vehicle body and the vehicle axle is increased thereby raising the front end of the vehicle. Conversely, as air or fluid is expelled from bladder 44 the distance between the vehicle body and the vehicle axle is decreased thereby lowering the front end of the vehicle. Vehicle height adjustment apparatus 34 would be provided in a similar fashion on each side of the front of vehicle 10.

Pilot operated diaphragm valve 46 is fixed to an external wall 64 of bladder 44 and is configured to quickly release air or fluid from bladder 44 when solenoid valve 48 is actuated. An example of a quick release valve or diaphragm valve 46 that may be used with bladder 44 is an Asco Valve No. 8210G4 sold by Asco Valve, Inc., Florham Park, N.J. Diaphragm valve 46 includes a housing 65 and a diaphragm 72. Housing 65 has a pressure chamber 66, a pair of inlet ports 68 and an outlet port 70. Diaphragm 72 when in a first (or open) position, as designated by dashed lines A, establishes a air or fluid flow path between inlet ports 68 and outlet port 70. Accordingly, when diaphragm 72 is in a second (or closed) position, designated by solid lines B, the flow path between inlet ports 68 and outlet port 70 is sealed off.

Solenoid operated valve 48 is connected to control unit 38 via control line 42 for receiving a control signal. When solenoid operated valve 48 is actuated by the control signal, the air or fluid contained within diaphragm chamber 66 is released through pilot tube 71 causing diaphragm 72 to move from a closed position B to open position A. When diaphragm 72 moves to open position A, fluid or air is released from bladder 44 allowing the bladder to depressurize. As the air or fluid is released from bladder 44, the body of the vehicle is lowered with respect to the ground.

Figure 4:
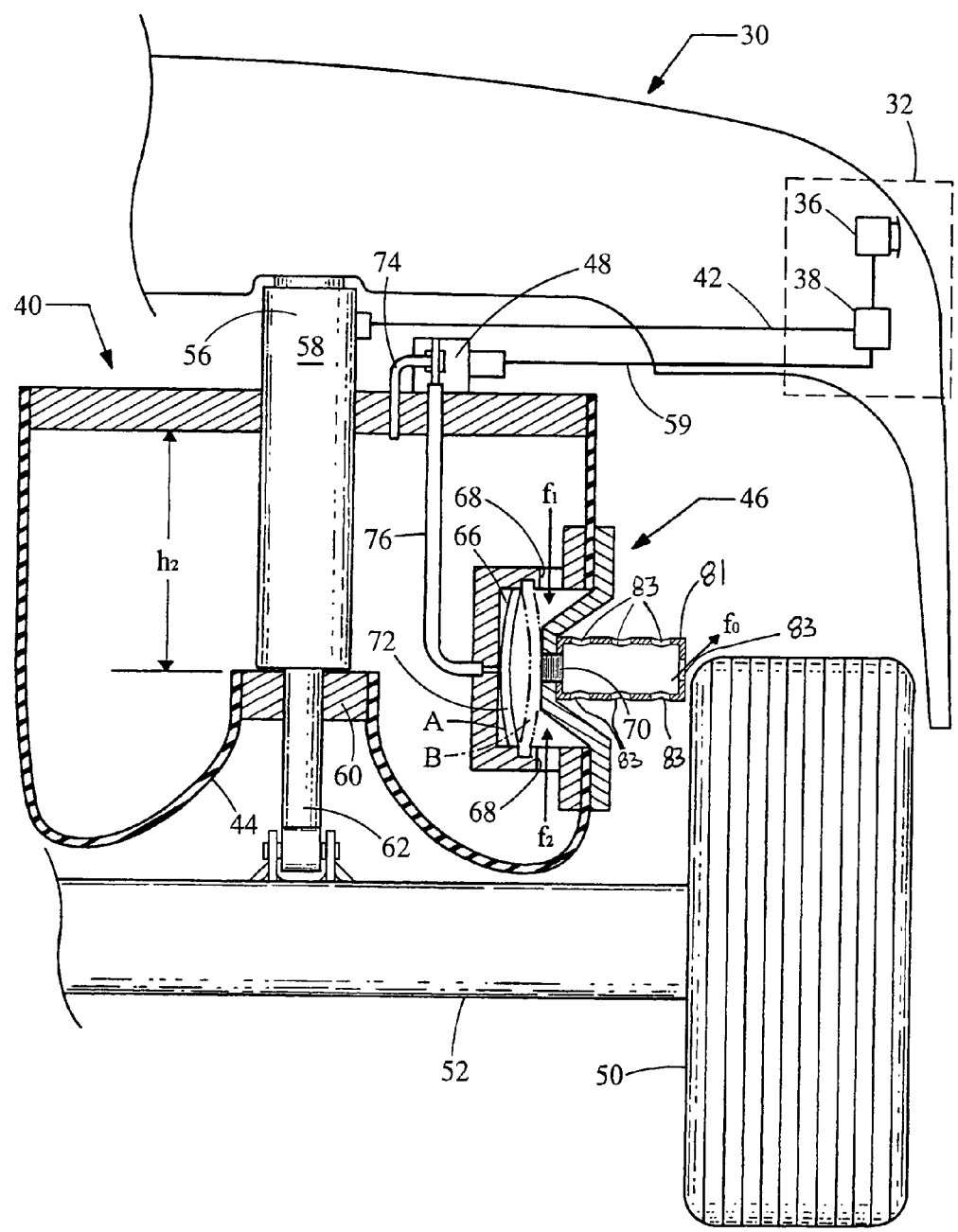
FIG. 4 is a diagrammatic illustration of a system for lowering a first vehicle with respect to the ground after the system has been actuated and the front end of the vehicle has been lowered, in accordance with an embodiment the present invention.

In an initial inflated condition, as shown in FIG. 3, vehicle lowering apparatus 34 has a predefined height H1. Predefined height H1 provides a corresponding suspension height as prescribed by the vehicle manufacturer for normal non-crash driving conditions. After a prescribed amount of air or fluid is released from bladder 44, as shown in FIG. 4, vehicle lowering apparatus 34 has a predefined height H2. Predefined height H2 is less than predefined height H1 and corresponds to a suspension height where the front bumper 14 of vehicle 10 is substantially aligned with either a front bumper of vehicle 12 or the frame structure of vehicle 12 as prescribed by the vehicle manufacturer for pre-crash conditions. Preferably, H2 is four to ten inches shorter than H1.

Figure 5:
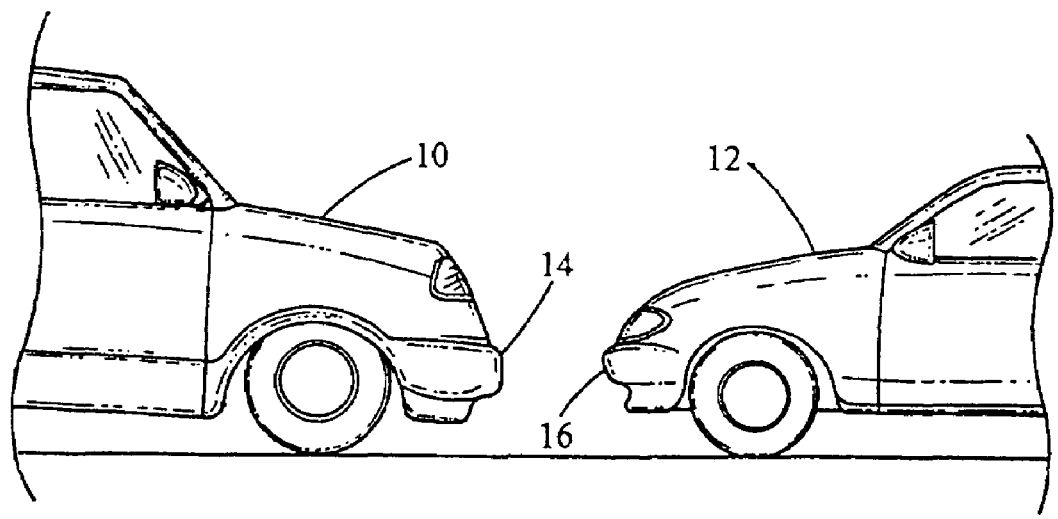
FIGS. 5 and 6 is a schematic illustration of a first vehicle prior to impacting a conventional vehicle wherein the first vehicle is equipped with vehicle height adjustment apparatus, in accordance with an embodiment the present invention.
Figure 6:
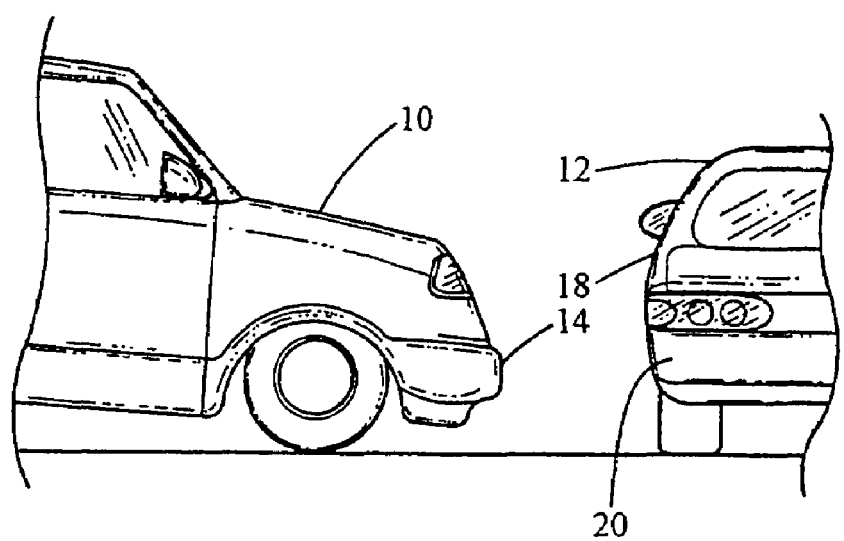

With reference to FIGS. 5 and 6 a vehicle 10' (the host vehicle) equipped with vehicle height adjustment apparatus 34 is illustrated in a pre-crash condition. As shown the front end of vehicle 10' has dipped down, upon the activation of vehicle height adjustment apparatus 34. As a result of the dipping of the front end of vehicle 10' the bumper 14 of vehicle 10' is substantially aligned with the bumper 16 of vehicle 12 (the target vehicle) as illustrated in FIG. 5. Similarly, in the case where vehicle 10' is impacting a side of vehicle 12 the dipping of the front end of vehicle 10' substantially aligns bumper 16 of vehicle 12 with the vehicle side frame structure of vehicle 12 as illustrated in FIG. 6.

In operation, predictive sensor 36 senses vehicle 12 sends a predictive sensor signal to predictive control unit 38. Control unit 38 determines whether the predictive sensor signal is indicative of an imminent vehicle collision. If control unit 38 determines that a vehicle crash is imminent, a crash signal is provided on line 42. The crash signal on line 42 activates solenoid valve 48 causing the valve to open. Upon the activation of solenoid valve 48, a flow path is opened between pilot tube 71 and atmosphere. As fluid or air is allowed to pass through pilot tube 71 and vented to the atmosphere, the pressure in cavity 66 is reduced. The reduced pressure in cavity 66 allows diaphragm 72 to spring into open position A. While in open position A, diaphragm 72 allows air to pass through valve inlet ports 68, as illustrated by arrows F1 and F2, and out outlet or exit port 70. The flow of air out of exit port 70 is designated by arrow $F_O$.

In an embodiment of the present invention, a silencer 81 as shown in FIGS. 3 and 4 is provided in communication with pilot valve 46 for reducing noise created by releasing fluid from the bladder. A plurality of exit ports 83 are disposed in silencer 81 for expelling fluid, as indicated by arrow $F_O$. Silencer 81 may be any known silencer adapted to cooperate with valve 46 to reduce the noise associated with the actuation and release of fluid from valve 46. For example, silencer 81 may be a silencer of the type offered by Norgren Automotive of Mt. Clemens, Mich. Silencer 81 may be attached to valve 46, however, the present invention contemplates embodiments where silencer 81 is located remotely from valve 46 and in communication with valve 46 through an exhaust tube (not shown).

System 30 may be reset after fluid has been released from bladder 44. For example, bladder 44, in an embodiment of the present invention, is connected to an onboard fluid supply reservoir (not shown). The fluid reservoir supplies the appropriate amount of fluid in bladder 44 to maintain the correct (i.e. manufacture specified) ride height. Once fluid is released from bladder 44 solenoid valve 48 is actuated to reset pilot valve 46 by pressurizing chamber 66 using a pressure feed tube 74. Pressure feed tube 74 is in communication with pilot tube 76 and uses the fluid stored in bladder 44 to pass through pilot tube 76 to pressurize chamber 66.

In an embodiment of the present invention, control unit 36 includes control code to close diaphragm valve 46 between sixty and one hundred milliseconds after opening valve 46. Closing valve 46 after a predefined time such as sixty to one hundred milliseconds after opening prevents the tires of vehicle 10 from bouncing and losing traction.

In another embodiment of the present invention, vehicle shock absorber 58 has varying dampening characteristics. As well known in the art, a control line 59 is connected to shock 58 for sending a control signal to shock 58 from control unit 38. Control code or logic is provided in control unit 38 for changing the damping characteristics of shock 58 when the nose dipping system 30 is actuated. More specifically, the damping characteristics would be adjusted to allow the shock to quickly stroke during vehicle nose dipping.

In yet another embodiment of the present invention a height sensor is provided for measuring the height of the vehicle relative to the ground. Control unit 38 further includes control logic to monitor the height sensor and then determine an appropriate amount to lower the front end of the vehicle. For example, if the front end of the vehicle has already lowered or dipped due to braking then control unit 38 would account for this (amount of lowering) and only dip or lower the front end of vehicle 10 an appropriate additional amount to align with the bumper or frame/structure of vehicle 12.

In still another embodiment of the present invention, control unit 38 further includes control code to account for scenarios where slow moving vehicles are passing in front of vehicle 10. In such scenarios a false positive determination that an approaching vehicle will impact the host vehicle is likely to occur. In order to decrease the number of false positive determinations, control code is provided that reduces the distance at which the nose dipping system 30 must be trigger to insure that the front end of the host vehicle has the time to drop sufficiently to align the bumpers or vehicle structures. As a result, the distance required to dip the nose of the vehicle is reduced at low speeds but the risk of false positives stays constant over the speed range of the vehicle.

Figure 7:
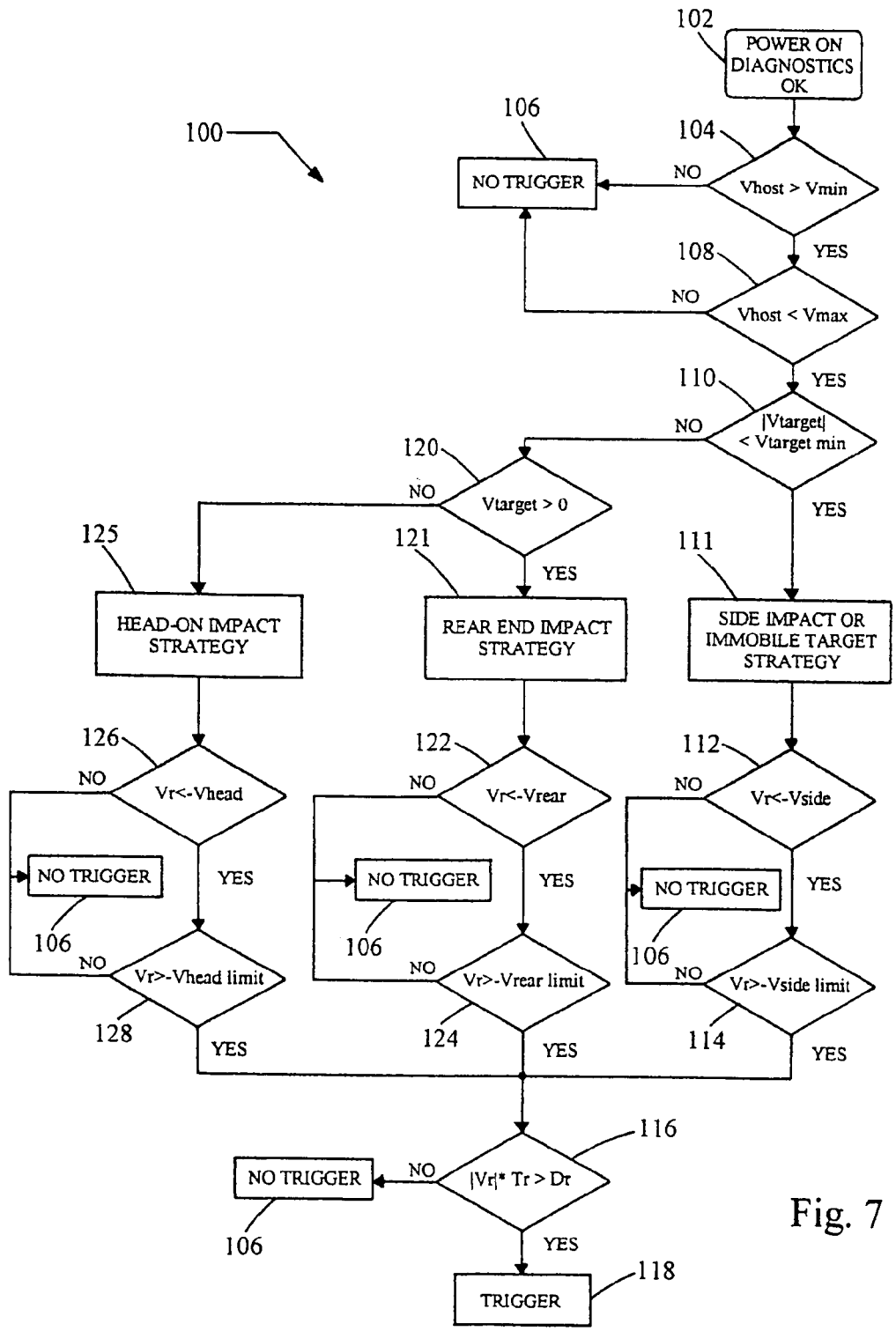
FIG. 7 is a flowchart illustrating a strategy for determining whether to trigger or initiate lowering or dipping of the front end of a vehicle, in accordance with an embodiment of the invention.

Referring now to FIG. 7, a flowchart of a strategy 100 for determining whether to trigger or initiate lowering or dipping of the front end of a vehicle is illustrated, in accordance with an embodiment of the invention. Strategy 100 is initiated at block 102 where the vehicle power is turned on and a diagnostic routine is completed to insure proper functioning of vehicle lowering system 30 of the present invention.

At block 104, a speed of host vehicle (Vhost) (i.e. vehicle 10') is compared to a predefined minimum speed (Vmin). If Vhost is determined to be less than Vmin then nose dipping system 30 is not triggered, as represented by block 106. However, if Vhost is determined to be greater than Vmin then Vhost is compared to a maximum speed of the vehicle (Vmax), as represented by block 108.

If Vhost is determined to be greater than Vmax then the nose dipping system of the present invention is not triggered, as represented by block 106. However, if Vhost is determined to be less than Vmax then the absolute velocity of the target vehicle (Vtarget) is compared to a minimum vehicle target speed (Vtarget_min), as represented by block 110.

If Vtarget is determined to be less than Vtarget_min a side impact or immobile target strategy 111 is entered and a relative velocity (Vr) is compared to a negative of the velocity of the vehicle that is impacted from the side (Vside), as represented by block 112. If the relative velocity Vr is determined to be less than the negative of Vside, then the relative velocity Vr is compared to the negative of a velocity side limit (Vside_limit), at block 114. However, if the relative velocity Vr is greater than the negative of Vside, then the method determines that vehicle dipping should not be triggered, as represented by block 106.

If, at block 114, the relative velocity Vr is determined to be greater than the negative of Vside_limit, then at block 116 the absolute value of the relative velocity |Vr| times a system time response (Tr) is compared to a relative distance (Dr) calculation determined by the predictive sensor, at block 116. If |Vr| times Tr is greater than Dr, then the method determines the front end of the vehicle should be lowered or dipped, as represented by block 118. If however, in the comparison of the |Vr| times Tr is determined to be less than Dr, then the method determines that it is too early to trigger and does not trigger system 30, as represented by block 106. If however, the velocity Vr is found to be less than the negative of the side limit, at block 114, then the system determines that vehicle dipping should not be triggered, as represented by block 106.

However, at block 110, if the method of the present invention determines that |Vtarget| is not less than the Vtarget_min then, at block 120, Vtarget is compared to zero. If Vtarget is greater than zero, then a rear end impact strategy 121 is initiated and, at block 122, Vr is compared to the negative of a velocity (Vrear) where Vrear is the velocity of the vehicle being rear-ended. If Vr is determined to be less than the negative of Vrear, then at block 124, Vr is compared to the negative of a velocity rear limit (Vrear_limit). However, if at block 122 Vr is not less than the negative of Vrear then vehicle nose dipping is not triggered, as represented by block 106. However, if at block 124, Vr is determined to be greater than the negative of Vrear_limit, then the |Vr| times Tr is compared to Dr, at block 116.

If however, at block 120, Vtarget is determined to be not greater than zero, then the host and target vehicles (i.e. vehicles 10' and 12) are presumed to be traveling in opposite directions and a head-on impact strategy 125 is entered. At block 126, the relative velocity Vr is compared to the negative of a velocity (Vhead), where Vhead is the velocity of the vehicle heading towards the host vehicle (i.e. vehicle 12'). If the relative velocity Vr is determined to be not less than the negative of Vhead then the vehicle nose dipping system 30 is not actuated, as represented by block 106. If however, relative velocity Vr is determined to be less than the negative of Vhead then, at block 128, the Vr is compared to the negative of a velocity head limit (Vhead_limit). If Vr is not greater than the negative of Vhead_limit then system 30 is triggered, as represented by block 106. However, if the relative velocity Vr is greater than the negative of Vhead_limit, then |Vr| times Tr is compared to the relative distance Dr, as represented at block 116.

As any person skilled in the art of safety systems for automotive vehicles and to systems for addressing vehicles of varying size involved in vehicle accidents will recognize from the previous detailed description and from the figures and claims, modifications and changes can be made to the preferred embodiments of the invention without departing from the scope of this invention defined in the following claims.

We claim:

1. A system for adjusting a height of a first road vehicle with respect to the ground prior to impacting a second road vehicle, the system comprising:
   a predictive crash sensor mounted to the first vehicle for sensing the second road vehicle;
   a control unit in communication with the predictive crash sensor for receiving a predictive crash signal and determining whether the first and the second road vehicles will collide; and
   a height adjustment apparatus mounted to the first road vehicle and in communication with the control unit wherein the height adjustment apparatus includes:
      a shock absorber mounted at a first end to a vehicle body of the first road vehicle and at a second end to a vehicle axle of the first road vehicle;
      a bladder fixed at a first end to the first end of the shock absorber and at a second end to the second end of the shock absorber; and
      a first valve in fluid communication with the bladder for releasing fluid stored in the bladder upon the issuance of a crash signal sent by the control unit; and
      a second valve in communication with the first valve for actuating the first valve.

2. The system of claim 1 wherein the second valve is a solenoid valve.

3. The system of claim 1 further comprising a pilot tube connecting the first valve with the second valve for actuating the first valve.

4. The system of claim 1 wherein the first valve includes a diaphragm for releasing fluid from the bladder.

5. The system of claim 1 wherein the second valve is mounted to the bladder.

6. The system of claim 1 wherein the first valve is mounted to a wall of the bladder.

7. The system of claim 1 wherein the second valve is connected to the control unit.

8. The system of claim 1 wherein the predictive crash sensor is a radar sensor.

9. The system of claim 1 wherein the shock absorber is a variable damper shock absorber wherein the damping characteristics of the shock absorber may be varied.

10. The system of claim 1 where in the second valve is electrically connected to the control unit.

11. The system of claim 1 wherein the second valve is in fluid communication with the first valve.

12. The system of claim 1 further comprising a silencer in communication with the first valve for reducing noise created by releasing fluid from the bladder.

13. A method for adjusting a height of a first road vehicle with respect to the ground prior to impacting a second mad vehicle, the method comprising:
   sensing the second road vehicle using a predictive crash sensor mounted to the first vehicle;
   receiving a predictive crash signal from a control unit in communication with the predicative crash sensor;
   determining whether the first and the second road vehicles will collide; and
   adjusting a height of the first vehicle with respect to the ground using a height adjustment apparatus, wherein the height adjustment apparatus is mounted to the first road vehicle and in communication with the control unit, wherein the height adjustment apparatus includes:

a shock absorber mounted at a first end to a vehicle body of the first road vehicle and at a second end to a vehicle axle of the first road vehicle;

a bladder fixed at a first end to the first end of the shock absorber and at a second end to the second end of the shock absorber;

a first valve in fluid communication with the bladder for releasing fluid stored In the bladder upon the issuance of a crash signal sent by the control unit; and a second valve in communication with the first valve for actuating the first valve.

14. The method of claim 13 wherein said step of adjusting further comprises closing the first valve a predetermined time after the first valve is opened.

15. The method of claim 13 wherein said step of adjusting a height adjustment apparatus further comprises monitoring a height of a front end of the first vehicle prior to the height adjustment.

16. The method of claim 15 wherein said step of adjusting a height adjustment apparatus further comprises adjusting a height of the first vehicle by less than a complete amount if the front end of the first vehicle has dropped in height.

17. The method of claim 13 further comprising monitoring a speed of the first vehicle before adjusting the height of the first vehicle.

* * * * *